US006816889B1

United States Patent
Graham (10) Patent No.: US 6,816,889 B1
(45) Date of Patent: Nov. 9, 2004

(54) ASSIGNMENT OF DUAL PORT MEMORY BANKS FOR A CPU AND A HOST CHANNEL ADAPTER IN AN INFINIBAND COMPUTING NODE

(75) Inventor: Stanley Graham, Cameron Park, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 589 days.

(21) Appl. No.: 09/897,458

(22) Filed: Jul. 3, 2001

(51) Int. Cl.$^7$ ............................................. G06F 15/167
(52) U.S. Cl. ....................... 709/213; 711/214; 711/215; 711/216; 711/217
(58) Field of Search ................................ 709/213, 214, 709/215, 216, 217

(56) References Cited

U.S. PATENT DOCUMENTS 6,400,730 B1 * 6/2002 Latif et al. .................. 370/466
6,594,329 B1 * 7/2003 Susnow ....................... 375/372
6,690,757 B1 * 2/2004 Bunton et al. ............... 375/371

OTHER PUBLICATIONS

Daniel Cassiday; InfiniBand™ Architecture Tutorial, Hot Chips, Aug. 2000, Sun Microsystems, 79 pages.

* cited by examiner

Primary Examiner—T. Nguyen
(74) Attorney, Agent, or Firm—Manelli Denison & Selter PLLC; Leon R. Turkevich (57) ABSTRACT

An InfiniBand™ computing node includes a dual port memory configured for storing data for a CPU and a host channel adapter in a manner that eliminates contention for access to the dual port memory. The dual port memory includes first and second memory ports, memory banks for storing data, and addressing logic configured for assigning first and second groups of the memory banks to the respective memory ports based on prescribed assignment information. The host channel adapter is configured for accessing the dual port memory via the first memory port, and the CPU is configured for accessing the dual port memory via the second memory port. The CPU also is configured for providing the prescribed assignment information to the addressing logic, enabling the host channel adapter to access the first group of memory banks via the first memory port as the CPU concurrently accesses the second group of memory banks via the second memory port. The CPU also dynamically reassigns the memory banks, enabling the host channel adapter to continue accessing the second group of memory banks via the first memory port, concurrent with the CPU accessing the first group of memory banks via the second memory port.

8 Claims, 4 Drawing Sheets

ASSIGNMENT OF DUAL PORT MEMORY BANKS FOR A CPU AND A HOST CHANNEL ADAPTER IN AN INFINIBAND COMPUTING NODE

BACKGROUND OF THE INVENTION

1. Field of the Invention

The present invention relates to an InfiniBand™ computing node configured for communication with remote computing nodes in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

Figure 1:
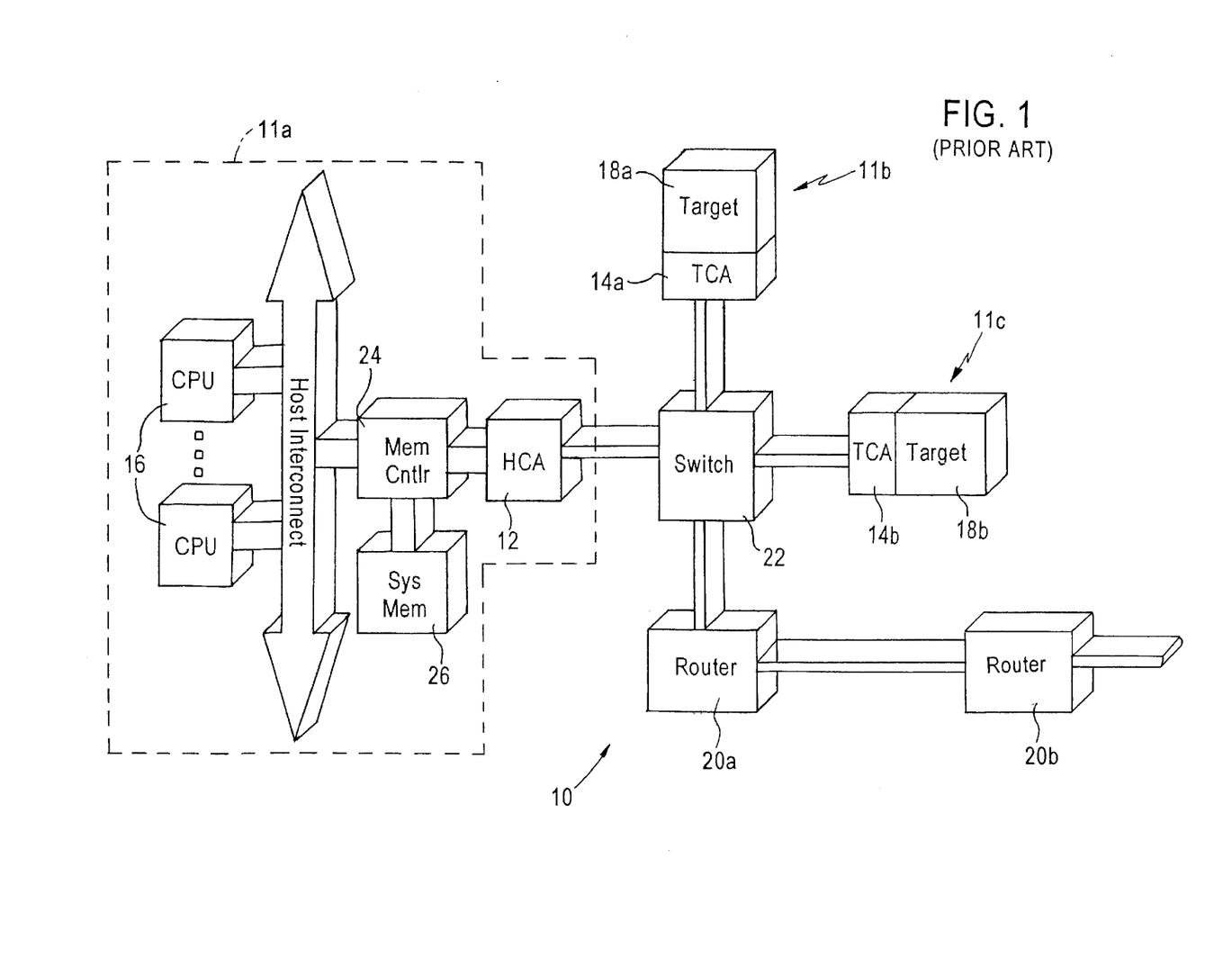
FIG. 1 is a diagram illustrating a conventional network according to the InfiniBand™ Architecture Specification.

The InfiniBand™ Architecture Specification describes a network architecture, illustrated in FIG. 1. The network 10 includes nodes 11, each having an associated channel adapter 12 or 14. For example, the computing node 11a includes processors 16 and a host channel adapter (HCA) 12; the destination target nodes 11b and 11c include target channel adapters 14a and 14b, and target devices (e.g., peripherals such as Ethernet bridges or storage devices) 18a and 18b, respectively. The network 10 also includes routers 20, and InfiniBand™ switches 22.

Channel adapters operate as interface devices for respective server subsystems (i.e., nodes). For example, host channel adapters (HCAs) 12 are used to provide the computing node 11a with an interface connection to the InfiniBand™ network 10, and target channel adapters (TCAs) 14 are used to provide the destination target nodes 11b and 11c with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines in the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

However, arbitrary hardware implementations may result in substantially costly hardware designs. In particular, implementation of the computing node 11a as illustrated in FIG. 1 creates throughput and latency issues due to contention for access of the single port memory 26 by the CPU 16, the HCA 12, or any other I/O device (e.g., the memory controller 24) having DMA capability.

SUMMARY OF THE INVENTION

There is a need for an arrangement that enables an InfiniBand™ computing node to be implemented in a manner that minimizes latency and optimizes throughput.

There also is a need for arrangement that optimizes memory resources within an InfiniBand™ computing node by eliminating memory access contention between memory resource consumers such as a CPU, or an HCA.

These and other needs are attained by the present invention, where an InfiniBand™ computing node includes a dual port memory configured for storing data for a CPU and a host channel adapter in a manner that eliminates contention for access to the dual port memory. The dual port memory includes first and second memory ports, memory banks for storing data, and addressing logic configured for assigning first and second groups of the memory banks to the respective memory ports based on prescribed assignment information. The host channel adapter is configured for accessing the dual port memory via the first memory port, and the CPU is configured for accessing the dual port memory via the second memory port. The CPU also is configured for providing the prescribed assignment information to the addressing logic, enabling the host channel adapter to access the first group of memory banks via the first memory port as the CPU concurrently accesses the second group of memory banks via the second memory port. Following access of the first group of memory banks by the host channel adapter, the CPU dynamically reassigns the memory banks, enabling the host channel adapter to continue accessing the second group of memory banks via the first memory port, concurrent with the CPU accessing the first group of memory banks via the second memory port. Hence, the host channel adapter can perform continuous memory access for transmission or reception of data without the necessity of the CPU directly accessing the host channel adapter. Hence, host channel adapter throughput may be optimized by eliminating contention for memory access between the host channel adapter and the CPU.

One aspect of the present invention provides a computing node configured for sending and receiving data packets on an InfiniBand™ network. The computing node includes a memory, a host channel adapter, and a processing unit. The memory has first and second memory ports, a plurality of memory banks for storing data, and addressing logic configured for assigning first and second groups of the memory banks to the respective first and second memory ports based on first prescribed assignment information. The host channel adapter is configured for accessing the memory via the first memory port for at least one of transmission and reception of a data packet according to InfiniBand™ protocol. The processing unit is configured for accessing the memory via the second memory port and providing the first prescribed assignment information to the addressing logic. The processing unit also is configured for overwriting the first prescribed assignment information in the addressing logic, following access of the first group of the memory banks by the host channel adapter, with second prescribed assignment information specifying assignment of the second group of the memory banks to the first memory port. Hence, the processing unit can switch memory banks accessible by the host channel adapter and the processing unit, enabling the continuous transfer of data between the processing unit and the host channel adapter via the memory.

Another aspect of the present invention provides a method in a computing node. The method includes coupling a processing unit and a host channel adapter to first and second memory ports of a memory, respectively. The memory has memory banks for storing data, and addressing logic configured for assigning first and second groups of the memory banks to the respective first and second memory ports based on first prescribed assignment information. The method also includes providing the first prescribed assignment information by the processing unit to the addressing logic, enabling the host channel adapter to access the first group of the memory banks. The memory banks are dynamically reassigned, following access of the first group of memory banks by the host channel adapter, by overwriting by the processing unit the first prescribed assignment information provided to the addressing logic with second prescribed assignment information specifying assignment of the second group of the memory banks to the first memory port. Hence, the processing unit dynamically controls access by the host channel adapter to memory banks, enabling the processing unit to write data into the first group of memory banks, and then reassign the ports to enable the host channel adapter to retrieve the data written into the first group of memory banks.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
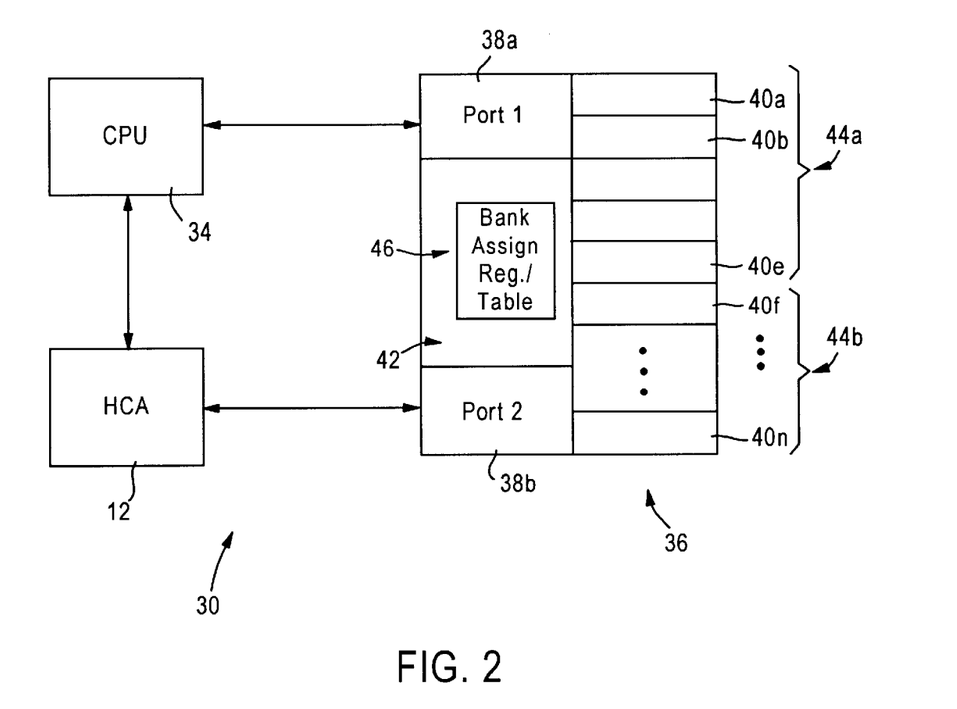
FIG. 2 is a diagram illustrating a computing node configured for providing InfiniBand™ communications for an InfiniBand™ network, according to an embodiment of the present invention.

FIG. 2 is a block diagram illustrating in detail a computing node 30 configured for sending and receiving data packets on an InfiniBand™ network according to an embodiment of the present invention. The computing node 30 includes a host channel adapter (HCA) 12, described in detail below with reference to FIG. 4. The computing node 30 also includes at least one central processing unit (CPU) 34 configured for generating a command for the HCA 12 using a verbs layer, described below, causing the HCA 12 to output a packet according to InfiniBand™ protocol. The HCA 12 serves as the interface for the CPU 34 to the InfiniBand™ network.

According to the disclosed embodiment, the computing node 30 also includes a dual port memory 36 that includes memory ports 38$a$ and 38$b$, memory banks 40 for storing data, and addressing logic 42. The addressing logic is configured for assigning the memory banks 40 as memory bank groups 44$a$ and 44$b$ to the memory ports 38$a$ and 38$b$, respectively. Hence, assignment of the memory bank group 44$a$ to the memory port 38$a$ ("Port 1") enables the CPU 34 to access any of the associated memory banks 40 (e.g., memory banks 40$a$ through 40$e$); similarly, assignment of the memory bank group 44$b$ to the memory port 38$b$ ("Port 2") enables the host channel adapter (HCA) 12 to access any of the associated memory banks 40 (e.g., memory banks 40$f$ through 40$n$). Hence, the CPU 34 and the HCA 12 can simultaneously access the respective assigned memory banks 40 without contention for access.

As described below with respect to FIG. 3, the CPU 34 dynamically reassigns the memory bank groups 44 and the ports 38, effectively creating a virtual switch that enables the HCA 12 (or CPU 34) to access a memory bank 40 that was accessed by the CPU 34 (or HCA 12) during the prior access cycle. For example, the CPU 34 may write transmit data to the memory bank 40$a$ via the corresponding port 38$a$ concurrent with the HCA 12 reading transmit data from the memory bank 40$f$ via the corresponding port 38$b$; the CPU 34 then dynamically reassigns the memory bank groups 44 and the ports 38 to enable the HCA 12 to read the transmit data from the memory bank 40$a$ via the corresponding port 38$b$ while the CPU 34 writes new transmit data into the memory bank 40$f$ via the corresponding memory port 38$a$.

Hence, the HCA 12 can transmit data packets by continually reading data via the corresponding memory port 38$b$, while the CPU 34 continually writes data via the corresponding memory port 38$a$.

The memory 36 includes either a bank assignment register or a bank assignment table 46 configured for storing the assignment information supplied by the CPU 34. In particular, implementation as a bank assignment register 46 enables the storage of a port assignment value that specifies assignment of a memory port to a prescribed memory bank group 44 (e.g., a value of "0" specifies that the bank 44$a$ is assigned to the port 38$a$; a value of "1" specifies that the bank 44$a$ his assigned to the port 38$b$); use of the bank assignment register is convenient if the memory bank groups 44$a$ and 44$b$ are of equal size. Alternatively, the implementation as a bank assignment table enables each of the banks 40 (or a subgroup thereof) to be individually assigned to one of the ports 38.

Figure 3:
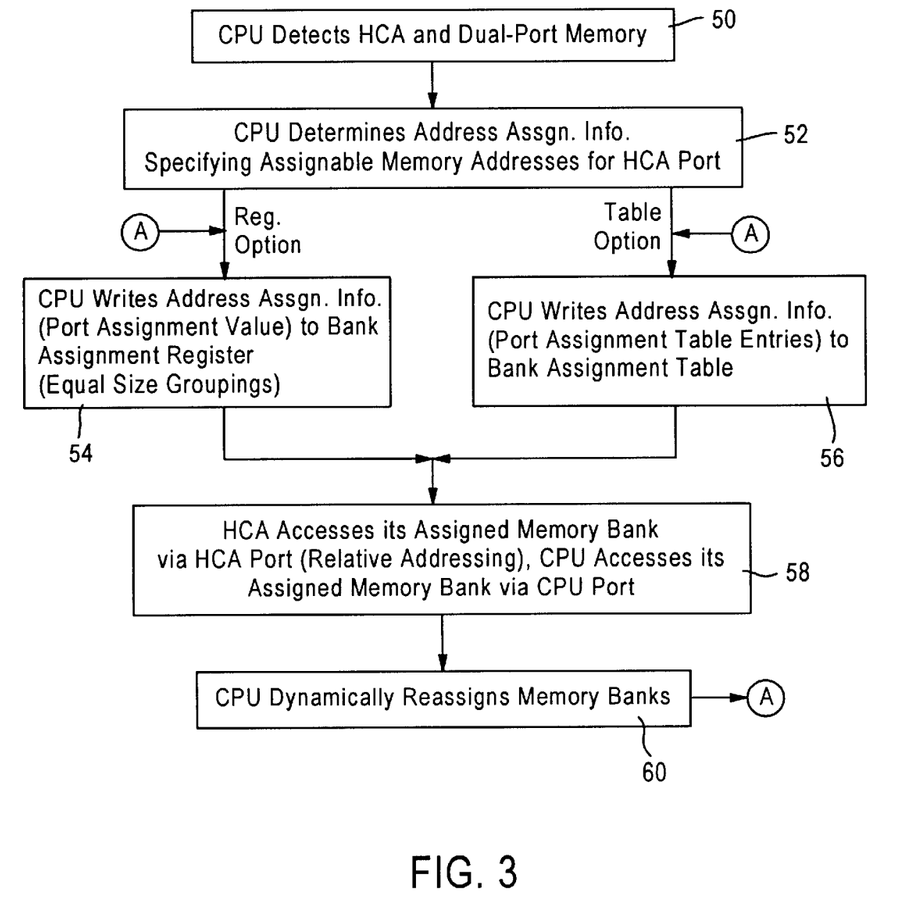
FIG. 3 is a diagram illustrating the method of programmable port-based addressing of the dual-port memory by the CPU of FIG. 2 according to an embodiment of the present invention.

FIG. 3 is a diagram illustrating the method of dynamically reassigning the memory banks 40 to the selected ports 38 for concurrent access by the CPU 34 and the HCA 12, according to an embodiment of the present invention. The method begins in step 50, where the CPU detects the HCA 12 and the dual port memory 36 during initialization. The CPU 34 in step 52 determines assignment information for assigning the memory bank groups 44 to the ports 38 for an initial access cycle. For example, the CPU 34 may generate first assignment information that specifies that the group 44a and the group 44b are assigned to ports 38a and 38b, respectively. Depending on the implementation of the bank assignment memory 46, the CPU 34 writes in step 54 the address assignment information in the form of a port assignment value into the bank assignment register 46; alternately, the CPU 34 writes in step 56 the address assignment information in the form of port assignment table entries for the respective memory banks 40 into the bank assignment table 46. In either case, the CPU 34 provides a prescribed assignment information to the addressing logic 42, enabling the host channel adapter 12 and the CPU 34 to access the respective assigned groups of memory banks 44 in step 58.

Hence, the CPU 34 and the HCA 12 concurrently access the respective memory bank groups 44 via the respective connected ports 38. For example, the CPU 34 may write transmit data into the memory bank group 44a as the HCA 12 is retrieving previously-written transmit data from the memory bank group 44b.

After the host channel adapter 12 has accessed the corresponding assigned memory bank 44, for example reading transmit data during a transmit operation or writing receive data during a receive operation, the CPU 34 dynamically reassigns the memory banks in step 60. For example, the CPU 34 may generate the complement value of the port assignment value and overwrite the first prescribed assignment information previously stored in the bank assignment memory 46; alternately, the CPU 34 may generate new table entries to be overwritten into the bank assignment table 46 in step 56. Regardless of implementation, the dynamically assignment by the CPU 34 enables the HCA 12 to retrieve transmit data from the memory bank group 44 that was accessed for writing of the transmit data during the prior access cycle.

Hence, the CPU 34 enables memory bank port assignments to be switched, enabling the transfer of data to the HCA 12 via the dual port memory 36 without introducing access contention issues.

Figure 4:
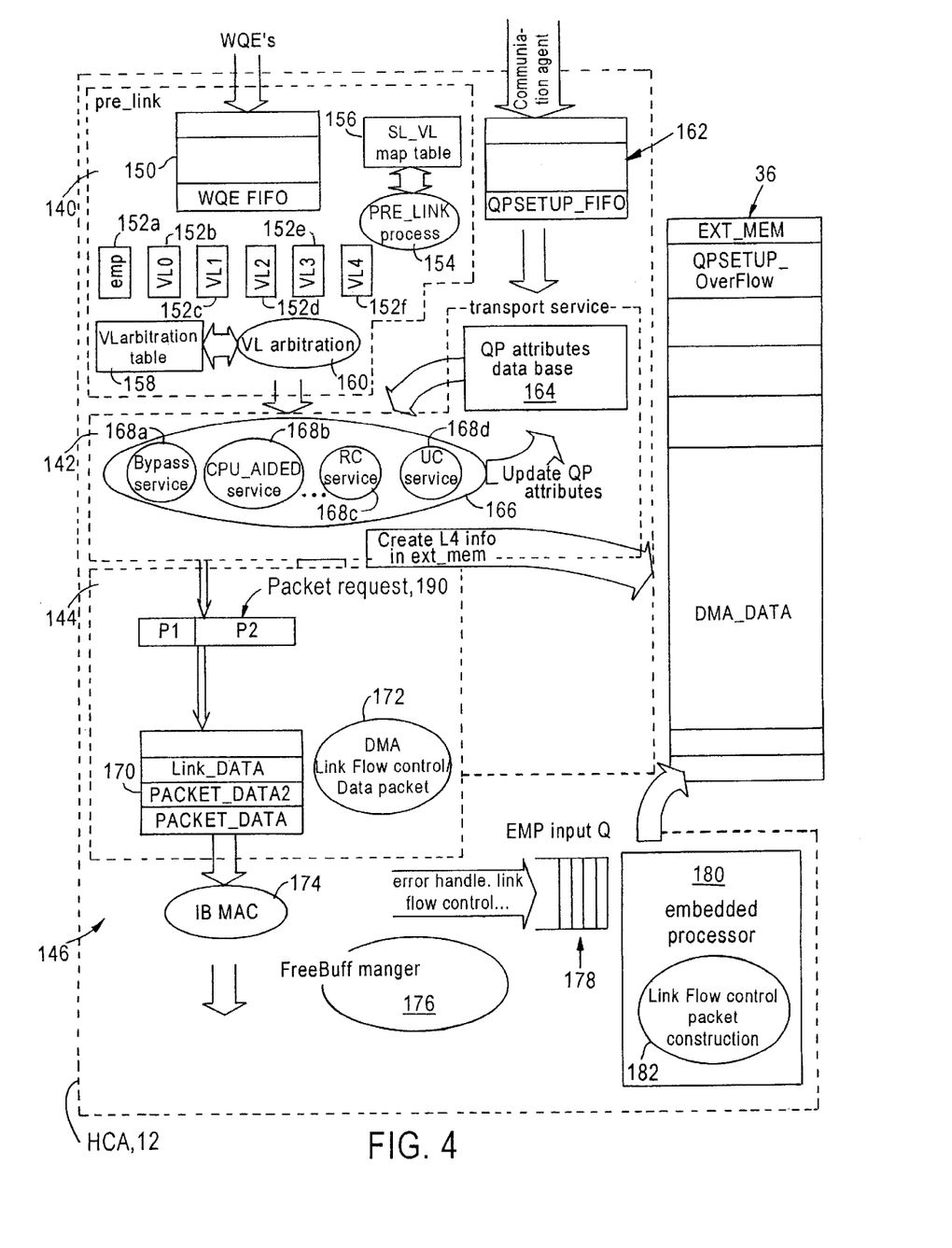
FIG. 4 is a diagram illustrating in detail the host channel adapter of FIG. 2 according to an embodiment of the present invention.

FIG. 4 is a block diagram illustrating a host channel adapter (HCA) 12 configured for generating and transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 includes a pre-link module configured for determining a priority of received WQEs, and a post-link module configured for preparing a data packet for transmission on the network. The pre-link module 140 orders the WQEs according to priorities determined by the pre-link module, and outputs the WQEs in the determined order to a transport service module 142 configured for generating the appropriate transport layer headers for the WQEs based on the associated queue pair attributes. In other words, the pre-link module 140 prevents the transport service module 142 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 140, a transport service module 142, a post-link module 144, and a media access control (MAC) module 146. The HCA 12 also has local access to the memory 36 configured for storing transport data and overflow buffers.

The pre-link module 140 includes a work queue element FIFO 150, virtual lane FIFOs 152, a pre-link process module 154, a service layer to virtual lane (SL-VL) mapping table 156, a virtual lane (VL) arbitration table 158, and a virtual lane (VL) arbitration module 160.

The HCA 12 is configured for receiving data from a central processing unit (CPU) in the form of work queue elements (WQEs), stored in the WQE FIFO 150. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 36. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 140 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 154 is configured for managing and maintaining the service layer-virtual layer mapping table 156. In particular, the pre-link process module 154 retrieves a WQE from the WQE FIFO 150, and determines the corresponding virtual lane based on the service layer specified within the WQE. Upon identifying the appropriate virtual lane for the retrieved WQE, the pre-link process module 154 forwards the WQE to the corresponding virtual lane FIFO 152.

The pre-link module 140 includes virtual lane FIFOs 152a, 152b, 152c, 152d, 152e, and 152f for storage of WQEs based on the assignment by the pre-link process module 154. For example, the virtual lane FIFO 152a is used for storing WQEs associated with embedded processor operations, for example link layer control packets and handling of error conditions. In other words, when a prescribed operation is not implemented in hardware, the request is sent to an embedded processor queue 178 for further processing by an embedded processor 180, described below; hence the embedded processor 180 has its own assigned queue 152a for outputting packets into the flow of output data traffic. The virtual lane FIFO 152b is used for storing WQEs associated with management traffic. The virtual lane FIFOs 152c, 152d, 152e, and 152f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 160 is implemented as a state machine with registers, and is configured for managing the VL arbitration table 158 for servicing of the virtual lanes, including setup, management, and teardown of the virtual lanes. The VL arbitration module 160 also determines which virtual lane to service, and outputs the WQEs from the virtual lane FIFOs 152 based on the determined priority of the virtual lanes. For example, the virtual lane FIFO 152b typically stores management (high-priority) traffic, hence the VL arbitration module 160 typically would empty the virtual lane FIFO 152b before servicing the other virtual lane FIFOs 152c, 152d, 152e, or 152f. The VL arbitration module 160 would then selectively output the WQEs from the virtual lane FIFOs 152c, 152d, 152e, or 152f based on weighted priorities stored in respective weight tables within the VL arbitration table 158.

Hence, the pre-link module 140 outputs the WQEs in a prescribed order based on a determined priority of the WQEs, for example based on assigned virtual lanes, or whether the WQE is for an embedded process, management traffic, or flow control traffic.

The transport service module 142 is configured for managing transport services, including setup, management, and teardown of queue pairs. In particular, the HCA 12 includes a queue pair setup FIFO 162 configured for storing queue pair commands received from a communication management agent. The communication management agent is responsible for setup and teardown of transport connections: the communication management agent communicates with a subnet manager to establish the transport connections (i.e., queue pairs) for the HCA 12. In addition, the communication management agents at each end during connection establishment use a bypass service (described below with respect to bypass service submodule 168a), as opposed to a conventional transport layer service, to establish the transport connections.

The transport service module 142 includes a queue pair attributes database 164 and a queue pair attributes management module 166. The queue pair attributes management module 166 is configured for processing the queue pair commands in the queue pair setup FIFO 162, and updating the queue pair attributes database 164 based on the received queue pair commands. For example, the queue pair attributes database 164 stores information relating to a source queue pair number, a destination queue pair number, and possibly source agent and destination agent. Hence, the queue pair attributes database 164 will include all information necessary to support the different transport services, including reliable connection service, reliable datagram service, unreliable connection service, unreliable datagram service, and raw datagram service.

The queue pair attributes management module 166 manages the transport services by updating the queue pair attributes database 164 during communication between the local and remote communication agents, for example when packet sequence numbers increase as messages are exchanged between the local and remote communication agents.

The queue pair attributes management module 166 also includes service submodules 168, each configured for managing a corresponding transport service type based on a corresponding received WQE from the pre-link module 140. For example, the bypass service submodule 168a is configured for managing bypass services during connection establishment or managing queue pairs associated with management operations with network managers that use, for example, the raw datagram service. The CPU aided service submodule 168b is configured for managing queue pairs based on embedded processor operations using the embedded virtual lane FIFO 152a; hence, the CPU aided service submodule 168b enables coordination between the local and remote embedded processes; moreover, implementation of the CPU aided service submodule 168b in conjunction with the embedded virtual lane FIFO 152a enables messages to be retransmitted if a resend request is received from the remote communication agent. The reliable connection (RC) service submodule 168c and the unreliable connection (UC) service submodule 168d are configured for managing queue pairs associated with reliable connection and unreliable connection transport services, respectively. Although not shown, the queue pair attributes management module 166 also includes submodules 168 for managing reliable and unreliable datagram services, and raw datagram service.

Hence, the transport service module 142, upon receiving a WQE from the pre-link module 140, supplies the WQE to the appropriate submodule 168 for processing (e.g., WQE for RC service handled by the RC service submodule 168c). The WQE includes service level (SL) information, and a pointer to the location of the actual message in the system memory 36. The submodule 168, in response to reception of the appropriate WQE, parses the WQE, and retrieves from the WQE the pointer that identifies the memory location for the transport data (i.e., the payload for the transport layer); the submodule 168 performs a DMA fetch of the transport data, updates the appropriate queue pair attributes within the queue pair attributes database 164, and creates and stores in the external memory 148a transport layer header for the WQE in a corresponding transport format; for example, the submodule 168a may generate a raw transport header, whereas the modules 168c or 168d may generate a transport header according to the reliable connection service or the unreliable connection service, respectively.

The submodule 168 then creates a header pointer (p1) that identifies the location of the transport layer header. The submodule 168 then sends to the post-link module 144 the payload pointer (p2) and the header pointer (p1) as a packet request 190, enabling the post-link module 144 to assemble the transport packet for transmission based on the supplied pointers. Alternately, the submodule 168 may generate a frame pointer to a system memory location that stores the transport layer frame, including the transport layer header and the transport data. If preferred, the submodule 168 also could forward the transport layer frame (including transport layer header and transport data) to the post-link module. Alternately, while writing to the external memory, the CPU may leave blank spaces at the beginning of the data, so that the actual header information that is created within the modules 168 can be stored in the corresponding empty memory space. The pointer passed down to the post-link module 144 could be this pointer which points to the beginning of the frame in the external memory.

The post-link module 144, in response to reception of the transport layer information (e.g., transport layer frame, packet request, etc.), fetches the transport layer header and the transport layer payload from the system memory 148 for generation of the transmit packet and storage in a transmit FIFO 170. In particular, the post-link module 144 also includes a link layer control module 172 configured for generating the transmit packet by generating link layer fields (e.g., local and global routing headers, cyclic redundancy check (CRC) fields, etc.), storage of the transmit packet in the transmit FIFO 170, and handling link layer control operations according to the InfiniBand™ Architecture Specification. Once the transmit packet has been generated, the pointers are forwarded to the free buffer manager 176, described below.

The link layer control module 172 outputs the transmit packets according to a credit-based flow control. In particular, the link layer control module 172 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 172 determines that an identified virtual lane has an insufficient number of credits, the link layer control module 172 defers transmission of the corresponding transmit packet until a sufficient number of credits have been received. If the virtual lane has a sufficient number of credits, the link layer control module 172 forwards the transmit packet to the MAC module 146 for transmission.

The MAC module 146 is configured for outputting the transmit packet stored in the transmit FIFO 170 according to the InfiniBand™ Architecture Specification. In particular, the MAC module 146 includes a transmission module 174, a free buffer manager 176, an embedded processor input queue 178, and an embedded processor 180 having a link flow control packet construction module 182. The transmission module 174 is configured for performing media access control operations, and optionally physical layer transceiver operations, for transmission of the transmit packet onto the InfiniBand™ network 10.

The free buffer manager 176 is configured for releasing available space from the external memory 148 once the transmit packet has been successfully received by the responder. In particular, the memory pointers for a transmit packet are sent from the post-link module 144 once the transmit packet has been generated; if a responder sends a message that the transmit packet needs to be resent in a reliable connection service, the transmit packet can be regenerated by the post-link module 144 and retransmitted to the responder. Once the transmit packet is successfully received, the frame pointers can be released for use by another agent.

Flow control is handled by the embedded processor 180 based on reception of information from the embedded processor input queue 178: in particular, the flow control protocol according to the InfiniBand™ Architecture Specification uses a credit-based flow control. The embedded processor 180 generates link flow control packets using the link flow control packet construction module 182, based on messages stored into the embedded processor input queue 178. The embedded processor 180 writes the link flow control packet to external memory 36; the embedded processor 180 then generates a WQE that includes the associated operation and a pointer specifying the location of a flow control packet into the embedded processor virtual lane FIFO 152*a*. The link flow control packet can then be output, specifying a number of available credits for another transmitting note.

Hence, the embedded processor 180 can generate a link flow control frame including the flow control header, and output the link flow control frame to the error processor input queue 178 for transmission to the network.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A computing node configured for sending and receiving data packets on an InfiniBand™ network, the computing node comprising:

a memory having first and second memory ports, a plurality of memory banks for storing data, and addressing logic configured for assigning first and second groups of the memory banks to the respective first and second memory ports based on first prescribed assignment information;

a host channel adapter configured for accessing the memory via the first memory port for at least one of transmission and reception of a data packet according to InfiniBand™ protocol; and a processing unit configured for accessing the memory via the second memory port and providing the first prescribed assignment information to the addressing logic, the processing unit configured for overwriting the first prescribed assignment information in the addressing logic, following access of the first group of the memory banks by the host channel adapter, with second prescribed assignment information specifying assignment of the second group of the memory banks to the first memory port.

2. The computing node of claim 1, wherein the addressing logic includes a bank assignment register configured for storing a port assignment value that specifies one of the memory ports to be assigned to a prescribed one of the first and second groups of the memory banks, the processing unit writing the first and second prescribed assignment information into the bank assignment register.

3. The computing node of claim 2, wherein the first and second groups of the memory banks are of equal size.

4. The computing node of claim 1, wherein the addressing logic includes a bank assignment table configured for storing port assignment values for the respective banks, each port assignment value specifying the assigned one of the first and second memory ports for the corresponding bank, the processing unit writing the first and second prescribed assignment information into the bank assignment table.

5. A method in a computing node, the method comprising:

coupling a processing unit and a host channel adapter to first and second memory ports of a memory, respectively, the memory having memory banks for storing data, and addressing logic configured for assigning first and second groups of the memory banks to the respective first and second memory ports based on first prescribed assignment information;

providing the first prescribed assignment information by the processing unit to the addressing logic, enabling the host channel adapter to access the first group of the memory banks; and dynamically reassigning the memory banks, following access of the first group of memory banks by the host channel adapter, by overwriting by the processing unit the first prescribed assignment information provided to the addressing logic with second prescribed assignment information specifying assignment of the second group of the memory banks to the first memory port.

6. The method of claim 5, wherein the providing step includes storing the first prescribed assignment information in a bank assignment register configured for storing a port assignment value that specifies one of the memory ports to be assigned to a prescribed one of the first and second groups of the memory banks.

7. The method of claim 6, wherein the first and second groups of the memory banks are of equal size.

8. The method of claim 5, wherein the addressing logic includes a bank assignment table configured for storing port assignment values for the respective banks, each port assignment value specifying the assigned one of the first and second memory ports for the corresponding bank, providing and dynamically reassigning steps each including storing the corresponding one of the first and second prescribed assignment information into the bank assignment table.

* * * * *